(12) United States Patent
Kato

(10) Patent No.: US 6,833,428 B1
(45) Date of Patent: Dec. 21, 2004

(54) POLYETHERESTER ELASTOMER

(75) Inventor: Kiyoo Kato, Kawasaki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 480 days.

(21) Appl. No.: 10/049,863

(22) PCT Filed: Aug. 18, 2000

(86) PCT No.: PCT/JP00/05563

§ 371 (c)(1),
(2), (4) Date: Feb. 19, 2002

(87) PCT Pub. No.: WO01/14447

PCT Pub. Date: Mar. 1, 2001

(30) Foreign Application Priority Data

Aug. 19, 1999  (JP) .......................................... 11-233014

(51) Int. Cl.$^7$ ..................... C08G 63/06; C08G 63/672
(52) U.S. Cl. ..................... 528/301; 528/272; 528/274; 528/300
(58) Field of Search ............................... 528/301, 272, 528/274, 300

(56) References Cited

U.S. PATENT DOCUMENTS

| | | | |
|---|---|---|---|
| 3,957,706 A | * | 5/1976 | Light et al. ................. 524/394 |
| 4,251,652 A | | 2/1981 | Tanaka et al. |
| 4,568,775 A | | 2/1986 | Aoshima et al. |
| 4,658,065 A | | 4/1987 | Aoshima et al. |
| 4,670,519 A | | 6/1987 | Mueller |
| 4,677,231 A | | 6/1987 | Aoshima et al. |
| 5,106,892 A | * | 4/1992 | Chiolle et al. ............... 524/120 |
| 6,570,041 B1 | * | 5/2003 | Kodama et al. ............ 568/617 |

FOREIGN PATENT DOCUMENTS

| | | |
|---|---|---|
| JP | 60-53531 | 3/1985 |
| JP | 60-55027 | 3/1985 |
| JP | 60-108424 | 6/1985 |
| JP | 3-249211 | 11/1991 |

* cited by examiner

Primary Examiner—Jeffrey B. Robertson
(74) Attorney, Agent, or Firm—Birch, Stewart, Kolasch & Birch, LLP

(57) ABSTRACT

Disclosed is a polyether ester elastomer comprising a copolymer of (A) at least one aromatic dicarboxylic acid or an ester-forming derivative thereof; (B) at least one diol selected from the group consisting of an aliphatic diol and an alicyclic diol, each having 2 to 10 carbons; and (C) a polyoxytetramethylene glycol (PTMG) having a number average molecular weight of from 500 to 4000, a molecular weight distribution (Mw/Mn) of 2.0 or less, a content of high molecular weight PTMG molecules of 10% by weight or less, and a heteropolyacid content of from 10 to 900 ppb by weight, wherein the polyether ester elastomer contains PTMG units in an amount of from 10 to 90% by weight, based on the weight of the polyether ester elastomer.

5 Claims, 2 Drawing Sheets

POLYETHERESTER ELASTOMER

This application is the national phase under 35 U.S.C. § 371 of PCT International Application No. PCT/JP00/05563 which has an International filing date of Aug. 18, 2000, which designated the United States of America.

BACKGROUND OF THE INVENTION

1. Field of the Invention

The present invention relates to a polyether ester elastomer. More particularly, the present invention is concerned with a polyether ester elastomer comprising a copolymer of (A) at least one aromatic dicarboxylic acid or an ester-forming derivative thereof, (B) at least one diol selected from the group consisting of an aliphatic diol and an alicyclic diol, each having 2 to 10 carbon atoms, and (C) a polyoxytetramethylene glycol (PTMG) having a specific number average molecular weight, a specific molecular weight distribution, a specific content of high molecular weight PTMG molecules, and a specific heteropolyacid content, wherein the polyether ester elastomer contains PTMG units in an amount of from 10 to 90% by weight, based on the weight of the polyether ester elastomer. The polyether ester elastomer of the present invention contains a soft segment composed of a specific PTMG having not only a high heat resistance, but also a low viscosity. By virtue of the presence of such a soft segment, the polyether ester elastomer of the present invention not only is improved with respect to the properties essentially required for an elastomer, such as low-temperature characteristics, flexure resistance, abrasive resistance and elastic recovery, but also has other excellent properties, such as high mechanical strength and elongation, small permanent compression set, high softening temperature, excellent mold release characteristics exhibited during injection molding thereof, and no tack on the surface of the ultimate shaped articles, which have not been conventionally achieved in the art.

2. Prior Art

A thermoplastic polyether ester elastomer is a polyether ester block copolymer comprised mainly of polybutylene terephthalate (which forms a hard segment) and polyoxytetramethylene glycol (which forms a soft segment), and exhibits rubber-like elasticity and weatherabiltiy. The fields in which the thermoplastic polyether ester elastomer is used have been increasing, and the thermoplastic polyether ester elastomer is now used in various fields, such as the fields related to electric and electronic parts, automobile parts, fibers and films.

At present, polyoxytetramethylene glycol (PTMG) is widely used for forming a soft segment of a polyether ester elastomer. However, depending on the molecular weight and molecular weight distribution of the PTMG employed, the final polyether ester elastomer may have the following problem. Due to the linear structure possessed by the PTMG, the PTMG contained in the polyether ester elastomer may sometimes be crystallized at low temperatures and, thus, the properties (such as characteristics at low temperatures and elastic recovery) of the polyether ester elastomer become unsatisfactory depending on the conditions under which the polyether ester elastomer is used. In order to solve this problem, attempts have been made to produce a raw material PTMG having a narrower molecular weight distribution (Mw/Mn) and a relatively low number average molecular weight (Mn) (see Unexamined Japanese Patent Application Laid-Open Specification Nos. 54-158497 and 60-55027).

As a conventional technique for obtaining a PTMG, a method disclosed in Unexamined Japanese Patent Application Laid-Open Specification No. 59-215320 (corresponding to U.S. Pat. No. 4,568,775) is known. Further, Unexamined Japanese Patent Application Laid-Open Specification No. 61-123626 (corresponding to U.S. Pat. No. 4,658,065) and Unexamined Japanese Patent Application Laid-Open Specification No. 59-221326 (corresponding to U.S. Pat. No. 4,568,775) have a description concerning the molecular weight distributions of the produced PTMG's. With respect to the techniques for removing the oligomers contained in a PTMG, Unexamined Japanese Patent Application Laid-Open Specification No. 61-123629 (corresponding to U.S. Pat. No. 4,677,231) discloses a method in which a thin film evaporator is used, and Unexamined Japanese Patent Application Laid-Open Specification No. 60-108424 discloses a method in which oligomers are separated from the PTMG by using water and an alcoholic solvent. In addition, with respect to the techniques for adjusting the content of a polymerization catalyst remaining in a PTMG, Unexamined Japanese Patent Application Laid-Open Specification Nos. 61-118420 and 61-115934 (both corresponding to U.S. Pat. No. 4,677,231) disclose a method in which a hydrocarbon or a halogenated hydrocarbon as an organic solvent is added to a PTMG to thereby separate the residual catalyst therefrom; and Unexamined Japanese Patent Application Laid-Open Specification No. 61-123629 (corresponding to U.S. Pat. No. 4,677,231) discloses a method in which an adsorbent is used to remove the catalyst.

The characteristics (such as molecular weight, molecular weight distribution, oligomer content and residual catalyst content) of the PTMG used as a raw material for a polyether ester elastomer are important factors which affect the quality of the final polyether ester elastomer. However, heretofore, no details are known in the art about how the characteristics of the PTMG influence the properties of the final polyether ester elastomer. In addition, no polyether ester elastomer are known, which have been adjusted, by strictly controlling the characteristics of the raw material PTMG, so as to have a good balance of various excellent properties.

Nowadays, the polyether ester elastomer is an important material which is used in a wide variety of fields, and the application field thereof is expected to become more extensive. Accordingly, there has always been a demand for improvement in the quality of the polyether ester elastomer. Further, improvements in different properties of the polyether ester elastomer are, respectively, desired in different application fields.

SUMMARY OF THE INVENTION

In this situation, the present inventors have made extensive and intensive studies with a view toward developing a novel polyether ester elastomer which has not only an improved rubber-like elasticity, but also a good balance of various excellent properties. As a result, it has unexpectedly been found that, when a polyether ester elastomer is produced by using a PTMG which has a specific molecular weight, a specific molecular weight distribution, a specific content of high molecular weight PTMG molecules and a specific heteropolyacid content, and which has not only high heat resistance, but also low viscosity, the produced polyether ester elastomer not only is improved with respect to the properties essentially required for an elastomer, such as characteristics at low temperatures, flexure resistance, abrasive resistance and elastic recovery, but also has other excellent properties, such as high mechanical strength and elongation, small permanent compression set, high softening temperature, excellent mold release characteristics exhibited during injection molding thereof, and no tack on the surface of the ultimate molded articles. Such properties have not been achieved in the art. The present invention has been completed, based on this novel finding.

Accordingly, it is an object of the present invention to provide a polyether ester elastomer which has a good balance of various excellent properties.

The foregoing and other objects, features and advantages of the present invention will be apparent to those skilled in the art from the following detailed description and appended claims taken in connection with the accompanying drawings.

DESCRIPTION OF REFERENCE NUMERALS

Figure 1:
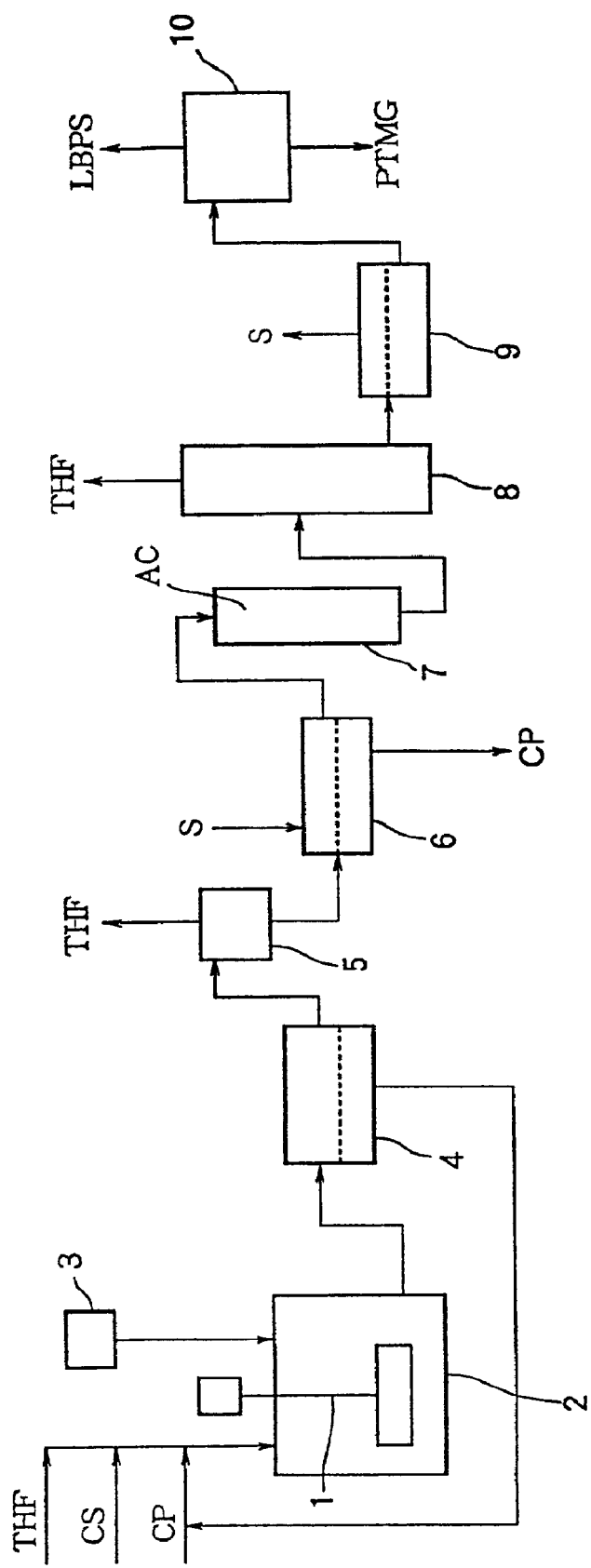
FIG. 1 is a schematic diagram showing the production system used in Reference Examples 1 to 4 for producing the specific PTMG used as a long chain diol component of the polyether ester elastomer of the present invention.

1: stirrer
2: reactor
3: water feeding tank
4: first, phase-separation vessel
5: distillation vessel
6: second, phase-separation vessel
7: adsorption column
8: distillation column
9: third, phase-separation vessel
10: vacuum distillation vessel

DETAILED DESCRIPTION OF THE INVENTION

According to the present invention, there is provided a polyether ester elastomer comprising a co-polymer of:

(A) at least one aromatic dicarboxylic acid or an ester-forming derivative thereof;

(B) at least one diol selected from the group consisting of an aliphatic diol and an alicyclic diol, each having 2 to 10 carbon atoms; and (C) a polyoxytetramethylene glycol (PTMG), wherein the polyether ester elastomer contains PTMG units in an amount of from 10 to 90% by weight, based on the weight of the polyether ester elastomer, the PTMG having the following characteristics (1) to (4):

(1) a number average molecular weight of from 500 to 4,000;

(2) a molecular weight distribution of 2.0 or less in terms of the Mw/Mn ratio, wherein Mw represents the weight average molecular weight of PTMG and Mn represents the number average molecular weight of PTMG;

(3) a content of high molecular weight PTMG molecules of 10% by weight or less, based on the total weight of all PTMG molecules, wherein the high molecular weight PTMG molecules are defined as PTMG molecules having molecular weights which are at least six times as large as the number average molecular weight of all PTMG molecules; and (4) a heteropolyacid content of from 10 to 900 ppb by weight.

For easy understanding of the present invention, the essential features and various embodiments of the present invention are enumerated below.

1. A polyether ester elastomer comprising a copolymer of:

(A) at least one aromatic dicarboxylic acid or an ester-forming derivative thereof;

(B) at least one diol selected from the group consisting of an aliphatic diol and an alicyclic diol, each having 2 to 10 carbon atoms; and (C) a polyoxytetramethylene glycol (PTMG), wherein the polyether ester elastomer contains PTMG units in an amount of from 10 to 90% by weight, based on the weight of the polyether ester elastomer, the PTMG having the following characteristics (1) to (4):

(1) a number average molecular weight of from 500 to 4,000;

(2) a molecular weight distribution of 2.0 or less in terms of the Mw/Mn ratio, wherein Mw represents the weight average molecular weight of PTMG and Mn represents the number average molecular weight of PTMG;

(3) a content of high molecular weight PTMG molecules of 10% by weight or less, based on the total weight of all PTMG molecules, wherein the high molecular weight PTMG molecules are defined as PTMG molecules having molecular weights which are at least six times as large as the number average molecular weight of all PTMG molecules; and (4) a heteropolyacid content of from 10 to 900 ppb by weight.

2. The polyether ester elastomer according to item 1 above, wherein the number average molecular weight of the PTMG is 700 to 3,000.

3. The polyether ester elastomer according to item 1 above, wherein the molecular weight distribution of the PTMG is not more than 1.75.

4. The polyether ester elastomer according to item 1 above, wherein the content of high molecular weight PTMG molecules is 2 to 5% by weight.

5. The polyether ester elastomer according to item 1 above, wherein the heteropolyacid content of the PTMG is 10 to 500 ppb by weight.

Hereinbelow, the present invention will be described in detail.

As mentioned in detail below, the polyether ester elastomer of the present invention comprises a hard segment composed of a short-chain polyester and a soft segment composed of a long-chain polyester. The hard segment is obtained from an aromatic dicarboxylic acid and a short-chain diol, and the soft segment is obtained from an aromatic dicarboxylic acid and a PTMG.

The polyether ester elastomer of the present invention comprises a copolymer of an aromatic dicarboxylic acid component (A) which is at least one aromatic dicarboxylic acid or an ester-forming derivative thereof, a short-chain diol component (B) which is at least one diol selected from the group consisting of an aliphatic diol and an alicyclic diol, each having 2 to 10 carbon atoms, and a long-chain diol component (C) which is a polyoxytetramethylene glycol (PTMG).

The aromatic dicarboxylic acid component (A) of the polyether ester elastomer of the present invention is at least one aromatic dicarboxylic acid or an ester-forming derivative thereof. An "ester-forming derivative" of an aromatic dicarboxylic acid means an ester of an aromatic dicarboxylic acid. In general, during the production of the polyether ester elastomer, a polyesterification in many cases is conducted by a transesterification reaction and, thus, any aromatic dicarboxylic acid derivatives which form esters by a transesterification reaction can be incorporated into the polyether ester elastomer of the present invention as aromatic dicarboxylic acid ester units.

Specific examples of aromatic dicarboxylic acids include terephthalic acid, isophthalic acid, phthalic acid, naphthalene-2,6-dicarboxylic acid, naphthalene-2,7-dicarboxylic acid, diphenyl-4,4'-dicarboxylic acid, 4,4'-diphenoxyethanedicarboxylic acid and 5-sulfoisophthalic acid. Examples of ester-forming derivatives of an aromatic dicarboxylic acid include dimethyl terephthalate, dimethyl isophthalate, dimethyl phthalate, diethyl terephthalate, dimethyl isophthalate, diethyl phthalate, di-n-propyl terephthalate, di-n-propyl isophthalate, di-n-propyl phthalate, diisopropyl terephthalate, di-n-butyl terephthalate, di-sec-butyl terephthalate, di-t-butyl terephthalate, diheptyl terephthalate, di-2-ethylhexyl terephthalate, diisononyl terephthalate, diisodecyl terephthalate, butylbenzyl terephthalate, dicyclohexyl terephthalate, dimethyl 2,6-naphthalenecarboxylate, diethyl 2,6-naphthalenedicarboxylate, dimethyl 2,7-naphthalenedicarboxylate, diethyl 2,7-naphthalenedicarboxylate, dimethyl diphenyl-4,4'-dicarboxylate, diethyl diphenyl-4,4'-dicarboxylate, dimethyl diphenoxyethanedicarboxylate and diethyl diphenoxyethanedicarboxylate. As the aromatic dicarboxylic acid component (A), the above-mentioned dicarboxylic acids and ester-forming derivatives thereof can be used individually or in combination. Of the above compounds usable as component (A), preferred are terephthalic acid, isophthalic acid, naphthalene-2,6-dicarboxylic acid, dimethyl terephthalate and diethyl terephthalate.

In the present invention, the aromatic dicarboxylic acid component (A) may further comprise a non-aromatic dicarboxylic acid, such as an alicyclic or aliphatic dicarboxylic acid, and an ester-forming derivative thereof. Specific examples of non-aromatic dicarboxylic acids and ester-forming derivatives thereof include alicyclic dicarboxylic acids, such as 1,4-cyclohexanedicarboxylic acid; aliphatic dicarboxylic acids, such as succinic acid, oxalic acid, adipic acid, sebacic acid, dodecanoic diacid and a dimer acid; and ester-forming derivatives thereof. When the aromatic dicarboxylic acid component (A) comprises an alicyclic or aliphatic dicarboxylic acid, the amount of the alicyclic or aliphatic dicarboxylic acid is preferably not more than 15 mol %, based on the molar amount of the aromatic dicarboxylic acid component (A).

The short-chain diol component (B) of the polyether ester elastomer of the present invention is at least one diol selected from the group consisting of an aliphatic diol and an alicyclic diol, each having 2 to 10 carbon atoms. The molecular weight of the short-chain diol component (B) used in the present invention is preferably not more than 300. Examples of the above-mentioned diols include aliphatic diols, such as ethylene glycol, 1,3-propylenediol, 1,4-butanediol, pentamethylene glycol, hexamethylene glycol, neopentyl glycol and decamethylene glycol; and alicyclic diols, such as 1,1-cyclohexanedimethanol, 1,4-cyclohexanedimethanol and tricyclodecanedimethanol. As the short-chain diol component (B), the above-mentioned short-chain diols can be used individually or in combination of two or more compounds. Of the above-exemplified diols usable as the short-chain diol component (B), preferred are ethylene glycol and 1,4-butanediol.

In the present invention, the short chain diol component (B) may further comprise an aromatic diol. Specific examples of aromatic diols include xylylene glycol, bis(p-hydroxyphenyl)methane, bis(p-hydroxyphenyl)propane, 2,2-bis[4-(2-hydroxyethoxy)phenyl]propane, bis[4-(2-hydroxyethoxy)phenyl]sulfone and 1,1-bis[4-(2-hydroxyethoxy)phenyl]cyclohexane. When the short-chain diol component (B) comprises an aromatic diol, the amount of the aromatic diol is preferably not more than 15 mol %, based on the molar amount of the short-chain diol component (B).

In the polyether ester elastomer of the present invention, the aromatic dicarboxylic acid component (A) and the short-chain diol component (B) in combination constitute a hard segment, that is, a short-chain polyester. With respect to the ratio of the aromatic dicarboxylic acid component (A) and the short-chain diol component (B) which are used in the production of the polyether ester elastomer of the present invention, the short-chain diol component (B) is preferably used in an amount of 1.2 to 2.5 mol, more preferably 1.5 to 2.2 mol, per mol of the aromatic dicarboxylic acid component (A).

A preferred combination of the aromatic dicarboxylic acid component (A) and the short-chain diol component (B) for producing the polyether ester elastomer of the present invention is a combination of terephthalic acid, dimethyl terephthalate or diethyl terephthalate with ethylene glycol or 1,4-butanediol (that is, a combination to form polyethylene terephthalate or polybutylene terephthalate as a hard segment), and a more preferred combination is a combination to form polybutylene terephthalate as a hard segment. Polybutylene terephthalate has a high crystallization rate and excellent moldability and, hence, a polyether ester elastomer containing a hard segment composed of polybutylene terephthalate exhibits a good balance of excellent properties in respect of, for example, rubber-like elasticity, mechanical properties, heat resistance and chemical resistance.

The long-chain diol component (C) of the polyether ester elastomer of the present invention is a polyoxytetramethylene glycol (hereinafter, frequently referred to as "PTMG"). The PTMG used in the present invention is a diol obtained by subjecting tetrahydrofuran to ring-opening polymerization in the presence of a heteropolyacid catalyst. Illustratively stated, the PTMG is a mixture of polymer chains each independently represented by the following formula (1):

$$H\text{—}(O\text{—}CH_2CH_2CH_2CH_2)_n\text{—}OH \tag{1}$$

wherein, n is independently an integer of from 2 to 4,000, preferably from 2 to 2,100.

It should be noted that there is no need for the PTMG molecules to have all molecular weights in the range of from 2 to 4,000 in terms of the value of n.

The PTMG used as the long-chain diol component (C) in the present invention is a PTMG having the following characteristics (1) to (4):

(1) a number average molecular weight of from 500 to 4,000;

(2) a molecular weight distribution of 2.0 or less in terms of the Mw/Mn ratio, wherein Mw represents the weight average molecular weight of PTMG and Mn represents the number average molecular weight of PTMG;

(3) a content of high molecular weight PTMG molecules of 10% by weight or less, based on the total weight of all PTMG molecules, wherein the high molecular weight PTMG molecules are defined as PTMG molecules having molecular weights which are at least six times as large as the number average molecular weight of all PTMG molecules; and (4) a heteropolyacid content of from 10 to 900 ppb by weight.

The long-chain diol component (C) is a component which constitutes the soft segment of the polyether ester elastomer, namely the long-chain polyester. In the present invention, it is important that the PTMG which constitutes the soft segment has the above-mentioned specific number average molecular weight, specific molecular weight distribution, specific content of high molecular weight PTMG molecules and specific heteropolyacid content, and exhibits not only high heat resistance, but also low viscosity. When a polyether ester elastomer is produced using such a PTMG, the polyether ester elastomer exhibits a good balance of greatly improved properties as compared to that of a polyether ester elastomer produced using a conventional PTMG. Illustratively stated, such a polyether ester elastomer exhibits high elasticity and elastic recovery, low permanent compression set, excellent low-temperature characteristics and mold release characteristics, as compared to those of the conventional polyether ester elastomer. Further, when a shaped article is produced from the polyether ester elastomer of the present invention, there is no tack on the surface of the produced shaped articles.

The number average molecular weight of the PTMG used in the present invention is in the range of from 500 to 4,000, preferably from 700 to 3,000, more preferably 800 to 2,500. The number average molecular weight of the PTMG can be determined, for example, by gel permeation chromatography (GPC) or by a terminal titration method (a method which comprises acetylating the terminals of a PTMG using acetic anhydride, decomposing the unreacted acetic anhydride into acetic acid, measuring the OH value of the acetylated PTMG by reverse titration using an alkali, and determining the number average molecular weight of the PTMG from the OH value). In preferred examples of the present invention, however, not only the number average molecular weight of the PTMG but also the molecular weight distribution and the content of high molecular weight PTMG molecules are determined by GPC. Illustratively stated, the GPC is conducted under the following conditions:

Apparatus: Shodex GPC system-11 (manufactured and sold by Showa Denko K. K., Japan);

Columns: Shodex OH pak SB806M (two columns and Shodex OH pak S802.5 (one column) (each manufactured and sold by Showa Denko K.K., Japan):

Detector: Differential refractometer;

Temperature: 60° C.;

Carrier: 0.02 mol/liter solution of LiBr in dimethylacetamide;

Flow rate of the carrier: 1.0 ml/min;

Sample: 100 μl of 0.8% PTMG solution in the carrier; and

Molecular weight standards: PTMG, Mn=547,000 (Mw/Mn=1.35), Mn=283,000 (Mw/Mn=1.08), Mn=99,000 (Mw/Mn=1.08), Mn=67,000 (Mw/Mn=1.04), Mn=35,500 (Mw/Mn=1.06), Mn=15,000 (Mw/Mn=1.09), Mn=6,700 (Mw/Mn=1.13), Mn=2,170 (Mw/Mn=1.12), Mn=1,300 (Mw/Mn=1.12), Mn=650 (Mw/Mn=1.18), and THF monomer.

When the number average molecular weight of the PTMG is less than 500, depending on the hard segment/soft segment weight ratio of the polyether ester elastomer, the average chain length of the short-chain polyester (hard segment) becomes smaller, thereby leading to a marked lowering of the melting point of the polyether ester elastomer. Accordingly, the heat resistance of the polyether ester elastomer becomes too low. On the other hand, when the number average molecular weight of the PTMG is higher than 4,000, the terminal group concentration per unit weight of the PTMG becomes low, so that the polymerization of the PTMG with other components for the polyether ester elastomer becomes difficult.

The molecular weight distribution of the PTMG used in the present invention is 2.0 or less, preferably 1.75 or less, more preferably 1.6 or less, and the lower limit is preferably 1.5 or more. In the present invention, the molecular weight distribution is defined as the Mw/Mn ratio, wherein Mw represents the weight average molecular weight of the PTMG and Mn represents the number average molecular weight of the PTMG. The Mw and Mn values are determined by GPC. When a polyether ester elastomer is produced using a PTMG having a molecular weight distribution of more than 2.0, the mechanical properties of the produced polyether ester elastomer, such as strength and elongation, become unsatisfactory. Further, since the soft segment composed of a PTMG having such a broad molecular weight distribution inevitably contains a large amount of high molecular weight PTMG molecules, the soft segment is likely to be crystallized, thereby lowering the low-temperature characteristics of the polyether ester elastomer. Theoretically, the lower limit of the molecular weight distribution is 1.0; however, in practice, it is difficult to produce a PTMG having a molecular weight distribution of less than 1.15.

The PTMG used in the present invention has a content of high molecular weight PTMG molecules of 10% by weight or less, based on the total weight of all PTMG molecules. In the present invention, the "high molecular weight PTMG molecules" are defined as PTMG molecules having molecular weights which are at least six times as large as the number average molecular weight of all PTMG molecules. The PTMG is a mixture of molecules (i.e., polymer chains) having different molecular weights.

A PTMG molecule having a molecular weight which is more than six times the number average molecular weight of all PTMG molecules has a melting point which is at least twice as high as that of the mixture of all PTMG molecules. Accordingly, when a large amount of high molecular weight PTMG molecules is contained in the PTMG, the high molecular weight PTMG molecules are likely to be crystallized and cause phase separation in the PTMG. In the present invention, the content of the high molecular weight PTMG molecules of the PTMG is determined by GPC under the above-mentioned conditions.

In the PTMG used in the present invention, the content of high molecular weight PTMG molecules is 10% by weight or less and, thus, the PTMG is in the form of a uniform PTMG mixture having a low viscosity. When such a PTMG is used in the polymerization reaction for producing a polyether ester elastomer, the PTMG is unlikely to cause a phase separation in the reaction system and a high polymerization rate can be achieved. In addition, the use of such a PTMG is also advantageous in that the obtained polyether ester elastomer exhibits excellent low-temperature characteristics and permanent compression set. The reason for this is considered to be due to the decrease in the amount of high molecular weight PTMG molecules which are easily crystallized, and therefore crystallization of the soft segment is suppressed to some extent.

The high molecular weight PTMG molecules are considered to improve the heat stability of the PTMG as a whole through interaction with low molecular weight PTMG molecules which have high heat decomposability. Therefore, in the present invention, it is preferred that a small amount of high molecular weight PTMG molecules is present in the PTMG used. Specifically, the content of the high molecular weight PTMG molecules is preferably in the range of from 2 to 8% by weight, more preferably 2 to 5% by weight, still more preferably 2 to 3.5% by weight, most preferably 2 to 3% by weight. When the content of the high molecular weight PTMG molecules is less than 2% by weight, the above-mentioned effect of the high molecular weight PTMG molecules to improve heat resistance becomes unsatisfactory.

The PTMG used in the present invention has a heteropolyacid content of from 10 to 900 ppb by weight (1 ppb by weight is $1 \times 10^{-9}$), preferably from 20 to 500 ppb by weight. As mentioned above, the PTMG is obtained by the ring-opening polymerization of a tetrahydrofuran in the presence of a heteropolyacid catalyst, and the heteropolyacid contained in the PTMG is the residual polymerization catalyst.

A heteropolyacid is an acid obtained by the condensation of an oxide of at least one metal species selected from the group consisting of molybdenum (Mo), tungsten (W) and vanadium (V), and an oxyacid of at least one element other than mentioned above, such as phosphorus (P), silicon (Si), arsenic (As), germanium (Ge), boron (B), titanium (Ti), cerium (Ce), cobalt (Co) and niobium (Nb). The atomic ratio of the metal species (any one or more of metals selected from the group consisting of Mo, W and V) contained in the heteropolyacid to other elements in the heteropolyacid is 2.5 to 12.

The heteropolyacid contained in the PTMG may be in the form of a salt. Specific examples of heteropolyacids include phosphomolybdic acid, phosphotungstic acid, phosphomolybdotungstic acid, phosphomolybdovanadic acid, phosphomolybdotungstovanadic acid, phosphotungstovanadic acid, phosphomolybdoniobic acid, silicotungstic acid, silicomolybdic acid, silicomolybdotungstic acid, silicomolybdotungstovanadic acid, germanotungstic acid, borotungstic acid, boromolybdic acid, boromolybdotungstic acid, boromolybdovanadic acid, boromolybdotungstovanadic acid, cobaltmolybdic acid, cobalttungstic acid, arsenomolybdic acid, arsenotungstic acid, titanomolybdic acid and ceromolybdic acid, and metal salts thereof.

The heteropolyacid content of the PTMG is defined as the total concentration of molybdenum, tungsten and vanadium (ions) which are present in the PTMG. The concentrations of molybdenum, tungsten and vanadium in the PTMG are determined by ICP-Mass spectrometry.

When the heteropolyacid content of the PTMG is more than 900 ppb by weight, it becomes difficult to perform the copolymerization reaction for producing the polyether ester elastomer. Even when the copolymerization reaction is performed, the resultant polyether ester elastomer is likely to suffer discoloration. Further, the weatherability, light resistance, oxidation resistance and the like of ultimate shaped articles obtained from such a polyether ester elastomer become low. On the other hand, when the heteropolyacid content of the PTMG is less than 10 ppb by weight, the heat stability of the PTMG becomes unsatisfactory, and the heat stability of the final polyether ester elastomer produced using such a PTMG also becomes low. The reason for this is considered to be that the heteropolyacid contained in the PTMG stabilizes the free terminals of the polyether ester elastomer so as to improve the heat stability of the polyether ester elastomer.

Hereinbelow, an explanation is made of one example of a method for producing the PTMG used in the present invention.

The PTMG having the above-mentioned specific molecular weight, specific molecular weight distribution and specific content of high molecular weight PTMG molecules can be synthesized in the following manner. The PTMG can be produced by conducting a continuous polymerization reaction in a two-phase system comprising a reaction-formed raw material tetrahydrofuran organic phase containing a polymer and a reaction-formed aqueous tetrahydrofuran/heteropolyacid catalyst phase, while controlling the retention time and the retention time distribution of the monomer (tetrahydrofuran) in the catalyst phase so as to control the molecular weight distribution of the polymer (PTMG).

As an example of a preferred method for producing the PTMG used in the present invention, there can be mentioned a method which comprises a polymerization step (to perform a ring-opening polymerization of tetrahydrofuran to produce the PTMG) conducted using a continuous reactor equipped with a stirrer, and a subsequent step for adjusting the residual heteropolyacid content of the produced PTMG. In the polymerization step for performing a ring-opening polymerization of tetrahydrofuran (hereinafter, referred to simply as "THF") in the presence of a heteropolyacid catalyst, the reaction system comprises the following two phases: a raw material THF organic phase and an aqueous THF/heteropolyacid catalyst phase having a specific gravity of from 1.8 to 2.3. The heteropolyacid is sparingly soluble in an anhydrous THF, but well soluble in a mixed solvent prepared by adding a small amount of water to THF. When a heteropolyacid solution having a specific gravity of from 1.8 to 2.3 which has been prepared by dissolving a heteropolyacid in the mixed solvent of water and THF is added to THF, the resultant reaction system separates into two phases, namely a THF organic phase and an aqueous THF/heteropolyacid catalyst phase (hereinafter, frequently referred to as "aqueous THF/catalyst phase" or simply as "catalyst phase"). The reason why such a reaction system is obtained is not fully elucidated, but considered to be that a small amount of water is coordinated to the heteropolyacid.

In the polymerization reaction performed in the above-mentioned reaction system comprising a THF organic phase and an aqueous THF/catalyst phase, the molecular weight distribution, especially the content of high molecular weight PTMG molecules, of the produced PTMG can be adjusted by appropriately controlling the rate (F) ($m^3$/hour) of feeding THF to the reactor, the motive power (P) (kW) applied to the liquid in the reactor, the volume (V) ($m^3$) of the liquid in the reactor, and the amount of the heteropolyacid catalyst used.

The synthesis of PTMG is conducted by a reaction between a reaction-formed THF organic phase containing a polymer and a reaction-formed aqueous THF/catalyst phase. The reaction system is an emulsion in which the reaction-formed THF organic phase and the reaction-formed aqueous THF/catalyst phase are mutually dispersed in each other both in the form of globules. The polymerization of PTMG is considered to take place in the aqueous THF/catalyst phase. In accordance with the progress of the polymerization reaction, the PTMG dissolved in the aqueous THF/catalyst phase is partitioned between the aqueous THF/catalyst phase and the THF organic phase, and the state of partition reaches an equilibrium under the reaction conditions and becomes stationary. In such a reaction system, when the retention time V/F (hr) of THF (raw material) in the reactor is increased, the retention time distribution of THF in the aqueous THF/catalyst phase becomes broad, and the amount of high molecular weight PTMG molecules increases. Contrary to the above, when the V/F value is decreased, the retention time distribution of THF in the aqueous THF/catalyst phase becomes narrow, and the amount of high molecular weight PTMG molecules decreases. Further, when it is intended to control the molecular weight distribution of the PTMG without varying the number average molecular weight thereof, the amount of heteropolyacid catalyst may be adjusted in accordance with the variation of the V/F value so as to maintain at a constant value the average retention time of THF as viewed per equivalent of the catalyst.

With respect to the motive power P/V ($kW/m^3$) applied to the liquid in the reactor, when the value of P/V is varied, the average particle diameters of globules of the aqueous THF/catalyst phase and the THF organic phase become varied. This variation in the average particle diameters of the globules is considered to result in a variation in the area of contact between the aqueous THF/catalyst phase and the THF organic phase, as well as a variation in the frequency of the coalescence and redivision of the above-mentioned globules, to thereby change the amounts of substances which are moving between the catalyst phase and the organic phase. Specifically, when the P/V value is increased, the amounts of substances which are moving between the catalyst phase and the organic phase become increased, and this increase causes the retention time of the THF monomer molecules in the catalyst phase to become uniform. As a result, it is considered that the retention time distribution of THF in the catalyst phase becomes narrow and the number of high molecular weight PTMG molecules becomes decreased. Contrary to the above, the decrease in the P/V value causes the retention time distribution of THF in the catalyst phase to become broad and causes the number of high molecular weight PTMG molecules to become increased.

A preferred PTMG used in the present invention as the long-chain diol component (C) has a number average molecular weight of from 700 to 3,000, a molecular weight distribution (Mw/Mn) of 1.75 or less, a content of high molecular weight PTMG molecules of from 2 to 5% by weight, and a heteropolyacid content of from 10 to 900 ppb by weight. Following is a method for producing such a preferred PTMG from THF using a heteropolyacid catalyst. In a reaction system where water is present in an amount sufficient to form a THF organic phase and an aqueous THF/catalyst phase having a specific gravity of from 1.8 to 2.3, the retention time (V/F) of THF is maintained within the range of from 0.5 to 20 hours, preferably from 0.7 to 15 hours. When the V/F value is smaller than the above-mentioned range, the conversion of THF is likely to become low. On the other hand, when the V/F value is larger than the above-mentioned range, the reaction time is likely to become long. With respect to the motive power (P/V) applied to the liquid in the reactor, the P/V value is maintained at 1.3 $kW/m^3$ or more, preferably 1.6 $kW/m^3$, the agitation of the reaction system becomes unsatisfactory and the distribution of the diameters of the globules in the reaction system become broad. As a result, the molecular weight distribution of the produced PTMG becomes broad and the control of the molecular weight distribution of the PTMG becomes difficult. By appropriately controlling the V/F and P/V values in the above-mentioned method, it is also possible to obtain a PTMG having a number average molecular weight of more than 3,000 and less than or equal to 4,000, a molecular weight distribution of more than 1.75 and less than or equal to 2.0, and a content of high molecular weight PTMG molecules of more than 5% by weight and less than or equal to 10% by weight.

The heteropolyacid content of the thus obtained PTMG is adjusted to 10 to 900 ppb by weight to obtain the PTMG used in the present invention. The heteropolyacid content can be adjusted by conventional methods, such as a method disclosed in Unexamined Japanese Patent Application Laid-Open Specification Nos. 61-118420, 61-115934 and 61-123629 (each corresponding to U.S. Pat. No. 4,677,231). However, it is preferred that the heteropolyacid content be adjusted by a method which comprises, for example, the following steps ① to ⑥:

① allowing the reaction mixture obtained in the polymerization step to stand still so as to separate the polymerization reaction mixture into a reaction-formed aqueous THF/catalyst phase and a reaction-formed THF organic phase containing PTMG, followed by recovering the THF organic phase containing PTMG;

② distilling off a portion of THF in the recovered THF organic phase, to thereby obtain a PTMG concentrate;

③ adding a saturated hydrocarbon having 5 to 10 carbon atoms to the PTMG concentrate so that a catalyst phase (containing a portion of the heteropolyacid dissolved in the PTMG concentrate) and an organic phase are formed, which are separated from each other by phase separation, and subsequently removing the catalyst phase;

④ subjecting the resultant organic phase to a treatment with an activated carbon and the like so as to remove the heteropolyacid dissolved in the organic phase by adsorption;

⑤ distilling off a portion of the monomer (THF) remaining in the organic phase so that a saturated hydrocarbon phase and a PTMG phase are formed; and ⑥ distilling off oligomers and residual organic solvents (such as THF and saturated hydrocarbon) from the obtained PTMG phase using a thin-film evaporator.

Examples of saturated hydrocarbons used in the operation for adjusting the heteropolyacid content of the PTMG include cyclopentane, cyclohexane, cycloheptane, cyclooctane, cyclononane, cyclodecane, methylcyclopentane, methylcyclohexane, 2-ethylhexane, pentane, hexane, heptane, octane, nonane and decane.

The PTMG used as the long-chain diol component (C) of the polyether ester elastomer of the present invention can be a PTMG copolymer, i.e., a copolymer of THF with a monomer other than THF. Examples of the comonomer to be copolymerized with THF include 3-methyltetrahydrofuran, 1,2-propylene oxide, 3-methyloxetane and the like. There is no particular limitation with respect to the content of comonomer units as long as the comonomer units cause no adverse effects on the properties of the final polyether ester elastomer, such as strength, elongation, low-temperature characteristics, flexure resistance, abrasive resistance, elastic recovery, moldability and surface texture. It is preferred that the content of the comonomer units be 20% by weight or less, more advantageously 10% by weight or less, based on the weight of the long-chain diol component (C).

In the present invention, the long-chain diol component (C) may further comprise a polyol other than PTMG. Examples of such polyols include poly(ethyleneoxy)glycol, poly(propyleneoxy)glycol, poly(1,2-propyleneoxy)glycol, a block or random copolymer of ethylene oxide and propylene oxide, a block or random copolymer of ethylene oxide and THF, and poly(2-methyl-1,3-propyleneoxy)glycol.

The amount of all PTMG units (that is, the amount of soft segment) contained in the polyether ester elastomer of the present invention is 10 to 90% by weight, preferably 25 to 75% by weight, based on the weight of the polyether ester elastomer. The preferred amount of the PTMG units may vary depending on the desired physical properties of ultimate shaped articles. In the present invention, the amount of PTMG units is defined as the ratio of the weight of soft segment to the weight of polyether ester elastomer, wherein the weight of soft segment is determined by $^1$H-NMR. Therefore, this value is different from the weight ratio of the PTMG used to the total weight of the raw materials (that is, the total weight of components (A), (B) and (C)).

In general, the hard segment of a polyether ester elastomer is composed of short-chain esters. On the other hand, the soft segment of a polyether ester elastomer is composed of long-chain esters, and the terminals of the polyether portions of the long-chain esters are linked to the dicarboxylic acids (forming the hard segment) via ester linkages, so that the soft segment and the hard segment are linked with each other. In the present invention, as a matter of convenience, the soft segment is defined as including the ester linkage at a terminal of the polyether portion thereof. Illustratively stated, for example, in the case of a polyether ester elastomer which is well known in the art, namely a polyether ester elastomer containing a hard segment composed of polybutylene terephthalate and a soft segment composed of polytetramethylene ether glycol (polyoxytetramethylene glycol), the hard segment and the soft segment are represented by the following formulae (2) and (3), respectively:

hard segment:

(2)

wherein A represents a divalent residue formed by removing carboxyl groups from a terephthalic acid, and B represents a divalent residue formed by removing terminal hydroxyl groups from 1,4-butandiol; and soft segment:

(3)

wherein A represents a divalent residue formed by removing carboxyl groups from a terephthalic acid, and D represents a divalent residue formed by removing terminal hydroxyl groups from PTMG.

The weight ratio of the hard segment to the soft segment can be measured accurately by $^1$H-NMR. When the content of the soft segment (typically PTMG) in the polyether ester elastomer is less than 10% by weight, the softness of the polyether ester elastomer becomes unsatisfactory, and thus, such a polyether ester elastomer is likely to exhibit only unsatisfactory physical properties as an elastomer. On the other hand, when the content of the soft segment is more than 90% by weight, although the polyether ester elastomer becomes very soft, the average chain length of the polymer in the hard segment becomes decreased and the cohesive force of the hard segment becomes decreased. Such hard segment is incapable of resisting the external force applied thereto, and causes the mechanical properties of the polyether ester elastomer to become markedly low. Such a polyether ester elastomer having low mechanical properties cannot be used as an elastomer material. In addition, the melting point of the polyether ester elastomer becomes disadvantageously low and, thus, the heat resistance of the polyether ester elastomer becomes disadvantageously low.

There is no particular limitation with respect to the method for producing the polyether ester elastomer of the present invention, and the conventional methods for producing a polyether ester elastomer can be employed. Specifically, as examples of such methods, there can be mentioned a method which comprises subjecting a lower alcohol diester of a dicarboxylic acid, an excess amount of low molecular weight glycol and PTMG to a transesterification reaction in the presence of a catalyst to thereby obtain a reaction product and then, subjecting the obtained reaction product to a polycondensation reaction under reduced pressure; a method which comprises subjecting a dicarboxylic acid, a glycol and PTMG to an esterification reaction in the presence of a catalyst to thereby obtain a reaction product and then, subjecting the obtained reaction product to a polycondensation reaction; and a method which comprises producing a short-chain polyester (such as polybutylene terephthalate), adding PTMG to the produced short-chain polyester, followed by addition of other dicarboxylic acids or other diols than used in the production of the short-chain polyester, or alternatively, other polyesters than the short-chain polyester, and subjecting the resultant mixture to a transesterification reaction to thereby obtain a random copolymer.

As mentioned above, in the production of the polyether ester elastomer of the present invention, the short-chain diol component (B) is preferably used in an amount of from 1.2 to 2.5, more preferably from 1.5 to 2.2, per mol of the aromatic dicarboxylic acid component (A). With respect to the amount of the long-chain diol component (C) used in the production of the polyether ester elastomer of the present invention, the long-chain diol component (C) is preferably used in an amount of from 0.0033 to 2.1 mol, more preferably 0.0042 to 1.5 mol, most preferably 0.016 to 0.42 mol, per mol of the combination of the aromatic dicarboxylic acid component (A) and the short-chain diol component (B).

Preferred examples of catalysts used for producing a polyether ester elastomer, that is, the catalysts which can be used for both the transestrerification or esterification reaction and the polycondensation reaction, include tetraalkyl titanates, such as tetra(isopropyly) titanate and tetra(n-butyl) titanate; a reaction product of such a tetraalkyl titanate and an alkylene glycol; a partially hydrolyzed product of teraalkyl titanate; metal salts of titanium hexaalkoxide; titanium carboxylates; and titanium(Ti)-containing catalysts, such as a titanyl compound. In addition, catalysts other than mentioned above can also be used. Examples of other catalyst include monoalkyltin compounds, such as mono-n-butylmonohydroxytin oxide, mono-n-butyltin triacetate, mono-n-butyltin monoctylate and mono-n-butyline monoacetate; dialkyl (or diaryl)tin compounds such as di-n-butyltine oxide, di-n-butyltin dioctylate; and metal catalysts or metal oxide catalysts of Mg, Pb, Zr, Zn, Sb and the like. These catalysts can be used individually or in a combination of two or more catalysts. Especially, when the above-mentioned catalysts are used individually, the use of tetralkytitanate or antimony trioxide is preferred, and when the above-mentioned catalysts are used in combination, the combination of tetraalkytitanate and magnesium acetate is preferred.

With respect to the amount of the esterification catalyst or polycondensation catalyst used, the catalyst is preferably added in an amount of from 0.005 to 0.5% by weight, more preferably from 0.03 to 0.2% by weight, based on the weight of the polymer produced. After adding the catalyst at the start of the transesterification or the esterification reaction, an additional catalyst may or may not be added during the polycondensation reaction.

The polyether ester elastomer of the present invention may optionally contain a substance other than the aromatic dicarboxylic acid component (A), the short-chain diol component (B) and the long-chain diol component (C) as a comonomer. Specifically, the polyether ester elastomer may contain a comonomer, such as polycarboxylic acids; polyfunctional hydroxy compounds; and oxyacids, such as α-lactic acid, γ-hydroxyhydroxy valeric acid, tartaric acid and citric acid. Further, when a polyfunctional component is incorporated into the polyether ester elastomer of the present invention, such a polyfunctional component advantageously functions to increase the viscosity of the polyether ester elastomer. The content of such a polyfunctional component in the polyether ester elastomer of the present invention is 3 mol % or less. Examples of substances which can be used as the polyfunctional component include trimellitic acid, trimesic acid, pyromellitic acid, benzophenonetetracarboxylic acid, butanetetracarboxylic acid, glycerin, pentaerythritol, and esters and acid anhydrides thereof.

In general, the molecular weight of a polyether ester elastomer is determined using the relative solution viscosity ($\eta_{rel}$) or specific viscosity ($[\eta]$) as an index. In the present invention, the $\eta_{rel}$ value of the polyether ester elastomer is determined by the following method. 0.5 g of a polyether ester elastomer is dissolved in 100 ml of o-chlorophenol, and the relative solution viscosity ($\eta_{rel}$) is measured at 25° C. using a Fenske viscometer (manufactured and sold by Canon Inc., Japan). It has been found that the $\eta_{rel}$ value within the range of from 1.4 to 2.5 causes an advantageous influence on the physical properties of a polyether ester elastomer. When the $\eta_{rel}$ value is less than 1.4, the mechanical properties of a polyether ester elastomer become poor due to a low molecular weight of the polyether ester elastomer, and the pelletization of such a polyether ester elastomer is difficult because the strength of the strands discharged from the reactor is poor. On the other hand, when the $\eta_{rel}$ value of a polyether ester elastomer is more than 2.5, the melt viscosity of such a polyether ester elastomer becomes too high, so that the discharge of the polyether ester elastomer from the reactor is likely to become difficult. Taking into consideration the balance between the mechanical properties of the polyether ester elastomer and the ease in discharge of the polyether ester elastomer from the reactor, the more preferred range of the $\eta_{rel}$ value is from 1.5 to 2.3.

The polyether ester elastomer of the present invention may optionally contain an antioxidant. The antioxidant may be added at any time during or after the production of the elastomer, but it is preferred that the antioxidant be added to the reaction system prior to an operation where the PTMG is exposed to high temperatures. For example, it is preferred to add the antioxidant at the start of the polycondensation reaction. It is desired that an antioxidant which is added to the reaction system at such point in time prevents the oxidative deterioration of the PTMG without inhibiting the polycondensation reaction or adversely affecting the activity of the catalyst. Specific examples of such antioxidants include aliphatic, aromatic or alkyl-substituted aromatic esters of phosphoric acid and phosphorous acid; hypophosphite derivatives; phosphorus compounds, such as phenylphosphonic acid, phenylphosphinic acid, diphenylphosphonic acid, polyphosphonate, a dialkylpentaerythritol diphosphite and a dialkylbisphenol A diphosphite; phenolic derivatives, especially hindered phenol compounds; sulfur-containing compounds, such as thioether-type compounds, dithioacid salt-type compounds, mercaptobenzimidazole-type compounds, thiocarbanilide-type compounds, and thiodipropionic acid ester; and tin-containing compounds, such as tin malate and dibutyltin monooxide. These compounds can be used individually or in combination. The amount of antioxidant used is preferably 0.01 to 2 parts by weight, relative to 100 parts by weight of the polyether ester elastomer.

The polyether ester elastomer of the present invention may optionally contain various conventional additives depending on the intended use thereof. Specific examples of additives include fillers or reinforcing materials, such as kaolin, silica, mica, titanium dioxide, alumnia, calcium carbonate, calcium silicate, a clay, diatomaceous earth, asbestos, barium sulfate, aluminum sulfate, calcium sulfate, basic magnesium carbonate, molybdenum disulfide, graphite, glass fibers and carbon fibers; lubricants or mold release agents, such as zinc stearate and bisamide stearate; dyes or pigments, such as carbon black, ultramarine, titanium oxide, zinc oxide, red oxide, Prussian blue, an azo pigment, a nitro pigment, a lake pigment and a phthalocyanine pigment; flame retardants, such as octobromodiphenyl and tetrabromobisphenol polycarbonate; hindered amine-type light stabilizers; UV light absorbers; foaming agents; thickening agents, such as an epoxy compound and an isocyanate compound and silicone oils and silicone resins. These additives may be added to the polyether ester elastomer of the present invention in an amount and by a method which are conventionally used in the production of additive-containing polyether ester elastomers.

The polyether ester elastomer of the present invention exhibits excellent low-temperature characteristics, flexure resistance, abrasive resistance, elastic recovery and the like which are the basic properties required for an elastomer. In addition, the polyether ester elastomer of the present invention contains a soft segment composed of the specific PTMG having not only a low viscosity, but also a high heat resistance. By virtue of the presence of such a soft segment, the polyether ester elastomer of the present invention exhibits excellent properties, such as high mechanical strength and elongation, small permanent compression set, high softening temperature, excellent mold release characteristics in injection molding thereof, and no tack on the surface of the ultimate shaped articles. Such a balance of properties has not been conventionally achieved in the art. Therefore, it is expected that the application field of the polyether ester elastomer of the present invention as a thermoplastic elastomer will be extensive.

The polyether ester elastomer of the present invention exhibits excellent heat resistance and has a heat stability sufficient for processing the elastomer; hence, it can be applied to various plastifying moldings. For example, the polyether ester elastomer can be easily shaped into various articles, such as a film, a sheet, a laminate film or sheet, a shaped molded article, a tube, a pipe and a container by an injection molding, an extrusion molding, a spray molding and the like methods. The polyether ester elastomer of the present invention can be utilized for various purposes in a wide variety of fields. For example, if desired, the polyether ester elastomer can be used in the form of a solution thereof to produce an adhesive or a cast film, or can be used in the form of a powder to form a coating. Further, the polyether ester elastomer can be used for producing foamed products, or can be used as a binder, and as an additive for other resins and rubbers.

Illustratively stated, the polyether ester elastomer of the present invention can be used for producing automobile parts, such as even speed joint boots, a slide plate, a door latch, an air bag cover, a flexible joint, bellows, Rack & Pinion (R & P) boots and suspension boots; materials and parts for electronic and electric equipment, such as a sound attenuation gear, a rubber switch, a cover for the antenna of a portable telephone, a tractor belt of a printer, a grip of a video camera, a sealing part for a VTR, a functional film sheet, a ball joint, a vibration absorbing damper for electronic parts, a roll for office automation machines, such as a facsimile roll, and a vibration absorbing damper for an HD drive and a CD, MD or VD player; industrial materials and civil engineering and construction materials, such as various cushioning materials including a cushioning material for a road, a cushioning material for a bridge and a base-isolating material, modifiers, a hydraulic tube, a packing, a diaphragm, a pier protection material, a fender, a cable liner, a fire hose, an inner lining for a gas pipe, a submersible pump, an antistatic sheet, a waterproof sheet and a composite sheet; daily commodities and sports articles, such as sports shoes, a spring mid sole, a hair brush, parts for fasteners, a grip of a ball-point pen, a golf ball, a frame of sunglasses, a caster cushion, a mop joint, a belt for a bicycle, a soft comb of a drier, a pump, a cap, an emblem, a button and an automobile band.

In addition, the polyether ester elastomer of the present invention can be used as modifiers for other polyester resins, polycarbonate resins, polyamide resins and the like. Especially, a polyether ester elastomer having a soft segment content of at least 50% by weight can be advantageously used as such a modifier.

In the fields related to automobiles, electricity, construction and civil engineering, there are very severe requirements with respect to the performances and durability of a polyether ester elastomer. For example, the important characteristics of a polyether ester elastomer used in such fields are softness which is maintained at a wide temperature range (for example, −40 to 100° C.), hardness and brittleness which do not increase even at low temperatures, physical properties (such as weatherability) which are maintained for a long time, capability to maintain its appearance, and high safety (no harmful influence on humans and the environment). In addition, it is important that the polyether ester elastomer can be disposed without causing any serious problems. Thus, the polyether ester elastomer of the present invention is capable of satisfying various demands under the current situation where both the demand for and anxiety about the use of chemical products are increasing.

BEST MODE FOR CARRYING OUT THE INVENTION

Hereinbelow, the present invention will be described in more detail with reference to the following Reference Examples, Examples and Comparative Examples, but they should not be construed as limiting the scope of the present invention.

Polyoxytetramethylone glycols (hereinafter, polyoxytetramethylene glycol is frequently referred to as "PTMG") used in the Examples and the Comparative Examples were synthesized in accordance with the following Reference Examples.

REFERENCE EXAMPLE 1

PTMG was produced using the production system shown in FIG. 1.

First, a heteropolyacid catalyst solution for use as a polymerization catalyst was produced as follows. A 2-liter reaction vessel was prepared, which is provided with a 3-way cock having three respective ends, wherein each end has attached thereto a condenser and an eggplant type flask for collecting and storing distillate produced by the condenser, so that the contents of the reaction vessel can by distilled. The this prepared reaction vessel was used for producing a heteropolyacid catalyst solution. 1 liter of tetrahydrofuran (THF) and 600 g of silicotungstic acid dodecahydrate were introduces into the reaction vessel in this order, and stirred at 60° C., while continuously removing an azeotropic vapor of water and THF from the reaction vessel. The specific gravity of a solution being formed in the reaction vessel was periodically measured while feeding THF to the reaction vessel every 10 minutes so as to compensate for the total amount of water and THF removed from the reaction vessel. When the specific gravity of the solution became 2.07, the reaction was terminated to thereby obtain a catalyst solution having a specific gravity of 2.07, namely, a solution of heterpolyacid catalyst in a THF/water mixture.

Next, polyoxytetramethylene glycol was produced by the following operation. Reactor 2 having a capacity of 500 ml was equipped with stirrer 1 and a reflux condenser. 180 ml of the above-obtained catalyst solution (CS) was charged into reactor 2 and 240 ml of THF (monomer) was added thereto to thereby obtain a reaction system comprised of a THF organic phase and an aqueous THF/catalyst phase. The obtained reaction system was stirred at 60° C. while maintaining the motive power (P/V) applied to the liquid per unit volume of the reactor at 1.95 kW/m$^3$ and while feeding THF to reactor 2 at a rate of 64 ml/hour, to thereby obtain a polymerization reaction mixture comprising a reaction-formed THF organic phase containing a polyoxytetramethylene glycol and a reaction-formed aqueous THF/catalyst phase. The retention time (V/F) of THF in reactor 2 was 6.6 hours. During the reaction, water was fed to reactor 2 from water feeding tank 3 so as to maintain the specific gravity of the aqueous THF/catalyst phase at 2.07. A part of the polymerization reaction mixture was transferred into first, phase-separation vessel 4, thereby separating the reaction mixture into two phases, namely an upper reaction-formed THF organic phase containing a polyoxytetramethylene glycol and a lower reaction-formed aqueous THF/catalyst phase. The upper phase was withdrawn from first, phase-separation vessel 4 at a rate which is the same as the rate of the feeding of THF, while the lower reaction-formed aqueous THF/catalyst phase (CP) was recycled to reactor 2.

The upper phase withdrawn from first, phase-separation vessel 4 (i.e., the reaction-formed THF organic phase containing polyoxytetramethylene glycol) was fed into distillation vessel 5 for removing unreacted THF. The THF concentration of the organic phase was adjusted to 45 to 50% by weight, thereby obtaining a polyoxytetramethylene glycol concentrate.

The above-mentioned operation for obtaining a polyoxytetramethylene glycol was continuously performed for 50 hours. 100 g of the polyoxytetramethylene glycol concentrate produced during the stable operation of the reactor was subjected to the following operations for adjusting the heteropolyacid content of the polyoxytetramethylene glycol.

100 g of the polyoxytetramethylene glycol concentrate was fed into second, phase-separation vessel 6. 120 g of n-octane (solvent, S) was added to second, phase-separation vessel 6 and stirred for 5 minutes at room temperature, thereby obtaining a mixture. The obtained mixture was allowed to stand still for approximately 5 minutes, so that the mixture was separated into a lower aqueous THF/heteropolyacid catalyst phase (CP) and an upper organic phase. 200 g of the upper organic phase which is a solution containing polyoxytetramethylene glycol was placed in a 500 ml eggplant type flask which was warmed in a water bath maintained at 50° C. Subsequently, the solution was applied to adsorption column 7 at a rate of 100 g/hour using a pump. Adsorption column 7 was a column packed with 1 kg of an activated carbon (AC) and the column had an outer jacket in which water heated to 45° C. was circulated so as to maintain the inner temperature of adsorption column 7 at 40° C. or higher.

An eluate (approximately 200 g) obtained from adsorption column 7 was placed in a 300 ml eggplant type flask heated in an oil bath maintained at 100° C. The eggplant type flask was equipped with Oldershaw distillation column 8 (number of theoretical plates: 10). The eluate in the eggplant type flask was subjected to distillation under atmospheric pressure with stirring to thereby remove THF in the eluate. The residual solution in the flask was transferred to a 300 ml separation funnel used as third, phase-separation vessel 9. In third, phase-separation vessel 9, the solution was allowed to separate into two phases, namely a phase containing polyoxytetramethylene glycol as a main component and a phase containing n-octane (S) as a main component. The lower phase (approximately 30 g) containing polyoxytetramethylene glycol was taken out from third, phase-separation vessel 9 and subjected to vacuum distillation in vacuum distillation vessel 10 for 20 minutes at 100° C. under a reduced pressure of not more than 0.1 Torr. Low-boiling point substances (LBPS), such as n-octane, THF and oligomers, were distilled off to thereby obtain PTMG. The obtained PTMG was approximately 23 g.

The obtained PTMG had a number average molecular weight of 1,810, a molecular weight distribution (Mw/Mn) of 1.60, and a content of high molecular weight polyoxytetramethylene glycol molecules which are at least six times as large as the number average molecular weight of all polyoxytetramethylene glycol molecules (hereinafter, simply referred to as "content of high molecular weight PTMG molecules") of 2.29% by weight. These values were determined by gel permeation chromatography (GPC) under the conditions mentioned below.

Figure 2:
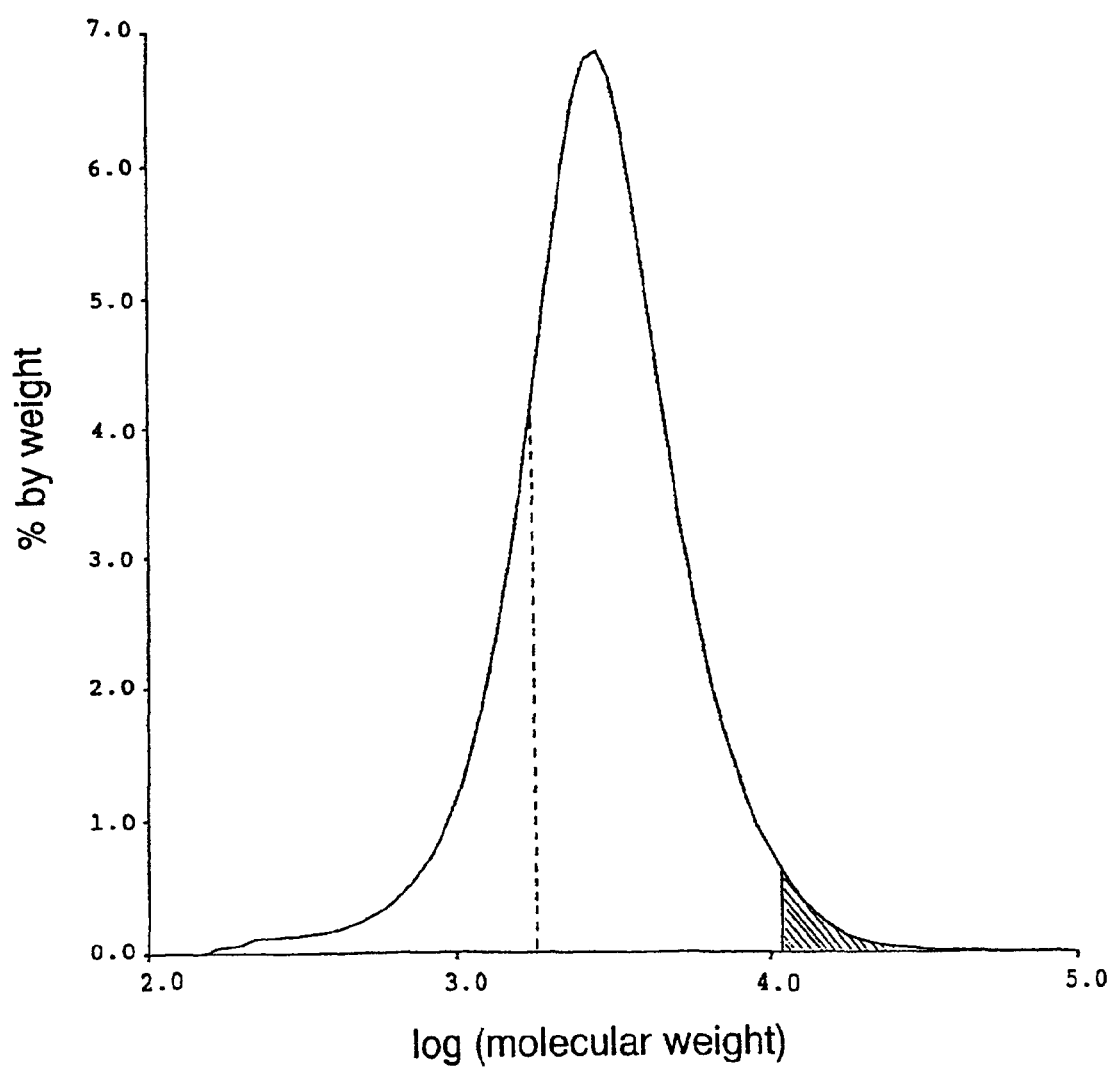
FIG. 2 is a chromatogram of the PTMG produced in Reference Example 1 which shows the molecular weight distribution of the PTMG, wherein the abscissa shows the logarithm (log) of the molecular weight, the ordinate shows the weight % of component PTMG molecules, based on the total weight of all PTMG molecules, the intersection of the vertical straight broken line and the abscissa shows the logarithm of the number average molecular weight, and the area of the hatched portion shows the amount of the PTMG molecules having molecular weights which are at least six times as large as the number average molecular weight of all PTMG molecules.

A chromatogram of the produced PTMG which shows the molecular weight distribution of the PTMG is shown in FIG. 2. In FIG. 2, the abscissa shows the logarithm (log) of the molecular weight; the ordinate shows the weight % of component PTMG, molecule, bases on the total weight of all PTMG molecules; and the intersection of the vertical straight broken line and the abscissa shows the logarithm of the number average molecular weight. The area of a hatched portion shows the amount of the PTMG molecules having molecular weights (10,860 or more; log (molecular weight)= 4.04 or more), which are at least six times as large as the number average molecular weight (Mn=1,810; log Mn=3.26) of all PTMG molecules. The ratio of the area of the hatched portion to the total area of the peak is 2.29%.

The heteropolyacid content of the obtained PTMG was determined by ICP-Mass spectrometry in terms of the tungsten content, and found to be 270 ppb by weight.

In the present invention, GPC and ICP-Mass spectrometry were conducted under the following conditions.

Conditions for GPC Analysis

GPC apparatus: Shodex GPC system-11 (manufactured and sold by Showa Denko K.K., Japan)

Column: Shodex OH pak (manufactured and sold by Shows Denko K.K., Japan):

SB 806 M (2 columns)

SB 802.5 (1 column)

Detector: Differential refractometer

Column temperature: 60° C.

Carrier (eluent): 0.02 mol/liter LiBr solution of dimethylacetamide

Flow rate of carrier: 1.0 ml/min

Sample: 100 µl of 0.8% PTMG solution in the carrier

Molecular weight standards: PTMG, Mn=547,000 (Mw/Mn=1.35), Mn=283,000 (Mw/Mn=1.08), Mn=99,000 (Mw/Mn=1.08), Mn=67,000 (Mw/Mn=1.04), Mn=35,500 (Mw/Mn=1.06), Mn=15,000 (Mw/Mn=1.09), Mn=6,700 (Mw/Mn=1.13), Mn=2,170 (Mw/Mn=1.12), Mn=1,300 (Mw/Mn=1.12), Mn=650 (Mw/Mn=1.18), and THF monomer.

Conditions for ICP-Mass Spectrometry

Approximately 5 g of a sample PTMG was heated in a quartz crucible to thereby calcine the sample PTMG. To the calcined PTMG was added 2 ml of 35% hydrochloric acid solution. Then, the resultant mixture was heated to decompose the calcined PTMG. To the decomposed PTMG were added 0.1 ml of an aqueous 1 ppm indium (In) solution as an internal standard and water in an amount such that the final volume of the resultant solution becomes 25 ml, to thereby obtain a sample PTMG solution. The obtained sample PTMG solution was subjected to ICP-Mass spectrometry using PQΩ-type ICP-MS (manufactured and sold by VG Elemental, England). The heteropolyacid content of PTMG was determined as the tungsten content of the PTMG using a calibration curve for tungsten.

The calibration curve used for determining the tungsten content was prepared using standard tungsten solutions for preparing a calibration curve which contained tungsten in various concentrations (5 to 10,000 ppb by weight). The standard tungsten solutions were prepared by adding 0.1 ml of an aqueous 1 ppm indium (In) solution as an internal standard to each of tungsten solutions (in 35% hydrochloric acid solution) having various concentrations and adding water thereto so that the final volume of the resultant solution becomes 25 ml.

REFERENCE EXAMPLE 2

PTMG was produced in substantially the same manner as in Reference Example 1, except that 80 ml of a phosphomolybdic acid solution having a specific gravity of 1.8 was used as a catalyst solution, the initial amount of THF charged in the reactor was 340 ml, the V/F value of THF in the reactor was 10 hours, and the P/V value was 2.3 kW/m$^3$.

The produced PTMG had a number average molecular weight of 970, a molecular weight distribution of 1.70, a content of high molecular weight PTMG molecules of 4.35% by weight, and a heteropolyacid content of 320 ppb by weight.

REFERENCE EXAMPLE 3

PTMG was produced in substantially the same manner as in Reference Example 1, except that the rate of the feeding of THF was 21 ml/hr, and the V/F value of THF in the reactor was 20 hours.

The produced PTMG had a number average molecular weight of 2,360, a molecular weight distribution of 1.70, a content of high molecular weight PTMG molecules of 4.20% by weight, and a heteropolyacid content of 180 ppb by weight.

REFERENCE EXAMPLE 4

PTMG was produced in substantially the same manner as in Reference Example 1, except that the P/V value of the reactor was 0.4 kW/m$^3$.

The produced PTMG had a number average molecular weight of 1,780, a molecular weight distribution of 1.85, a content of high molecular weight PTMG molecules of 8.40% by weight, and a heteropolyacid content of 280 ppb by weight.

In the following Examples and Comparative Examples, various properties of a polyether ester elastomer were evaluated and measured by the following methods.

Unless otherwise specified, test specimens for evaluating and measuring the physical properties of a polyether ester elastomer were prepared by compression molding (clamping tonnage: 50 tons) the polyether ester elastomer by means of a hydraulic molding machine (T-3 type hydraulic molding machine, manufactured and sold by Toho Press Seisakujo, Japan) at a temperature which is 30° C. higher than the melting temperature of the polyether ester elastomer.

(1) Relative Solution Viscosity ($\eta_{rel}$)

0.5 g of a polyether ester elastomer was dissolved in 100 ml of o-chlorophenol (guaranteed reagent, manufactured and sold by WAKO PURE CHEMICAL Industries Ltd., Japan) to thereby obtain a sample solution. Relative solution viscosity ($\eta_{rel}$) of the sample solution was measured at 25° C. using a Fenske viscometer (manufactured and sold by Canon Inc., Japan).

(2) Melting Temperature

Approximately 10 mg of a polyether ester elastomer was subjected to differential scanning calorimetry by means of a differential scanning calorimeter (DSC-200, manufactured and sold by Seiko Instruments Inc., Japan) under conditions where the temperature was increased at a rate of 10° C./min under a nitrogen atmosphere (10 cc/min), to thereby obtain a DSC chart showing a heat absorption peak of the polyether ester elastomer. The melting temperature of the polyether ester elastomer was obtained as the temperature at the peak top of the heat absorption peak.

(3) Soft Segment Content

The soft segment content of a polyether ester elastomer is the weight % of the soft segment contained in the polyether ester elastomer, based on the weight of the polyether ester elastomer. The soft segment content was determined by $^1$H-NMR conducted under the conditions summarized in Table 1 below. A 10% solution of a polyether ester elastomer (in a mixed solvent of heavy chloroform ($CDCl_3$) and trifluoroacetic acid (TFA) ($CDCl_3$:TFA weight ratio=2:1)) was used as a sample for NMR analysis.

TABLE 1

| Conditions for NMR | |
|---|---|
| Apparatus | AC200 FT-NMR (200 MHz) (manufactured and sold by Bruker Instruments, Germany) |
| Target nucleus | $1_H$ |
| Frequency | 2,000 Hz |
| Integration | 50 times |
| Pulse | 9.8 µs (45°) |
| Temperature | 25° C. |
| Concentration of a sample | 10% (A mixed solvent of a heavy chloroform ($CDCl_3$) and trifluoroacetic acid (TFA) ($CDCl_3$:TFA weight ratio = 2:1) was used as a solvent.) |

(4) Tensile Strength at Break and Elongation at Break

Tensile strength at break and elongation at break were measured in accordance with JIS K6301 (using a dumbbell No. 3 prescribed therein) at 25° C.

(5) Hardness

Shore 'D' hardness was measured in accordance with ASTM D2240.

(6) 10% Modulus

A test specimen having a length of 20 mm, width of 3 mm, and a thickness of 2 mm was prepared. 10% modulus of the test specimen was measured at −25° C. at a head speed of 20 mm/min.

(7) Elastic Recovery

A test specimen having a length of 20 mm, a width of 3 mm, and a thickness of 2 mm was prepared. The test specimen was stretched at −25° C. at a head speed of 20 mm/min until the length of the specimen became 200% of the original length. The stretched specimen was held under tension at the same temperature for 5 minutes and then released from tension. 1 minute after the release from tension, the degree of elongation of the specimen was measured. The elastic recovery was calculated from the degree of elongation.

(8) Mold Release Characteristics

Using an injection molding machine (IS-80CN, manufactured and sold by Toshiba Machines Co., Ltd. Japan), test specimens (130 mm×11 mm×2 mm) were prepared by injection molding under the following conditions: an injection molding temperature of 190 to 210° C., an injection pressure of 50 to 60 kg/cm² and a mold temperature of 60° C. The mold release characteristics of the test specimens were evaluated, based on the following criteria.

⊚: A test specimen falls by itself from the mold under the action of an ejection pin.

◯: A test specimen does not fall by itself from the mold under the action of an ejection pin, but can be easily released from the mold by hand.

Δ: A test specimen sticks to the mold and is difficult to remove from the mold even by hand.

X: A test specimen strongly sticks to the mold and the specimen is distorted when it is ejected from the mold.

(9) Dunlop Impact Resilience

Dunlop impact resilience was measured in accordance with BS 903 at room temperature.

(10) Permanent Compression Set

Permanent compression set was measured in accordance with JIS K6301 at room temperature for 22 hours or 70° C. for 22 hours.

(11) Vicat Softening Temperature

Vicat softening temperature was measured in accordance with JIS K7206 under a load of 1 kg and while elevating the temperature at a rate of 50° C./hr. The Vicat softening temperature was obtained as a temperature where a flat-ended needle penetrated into the test specimen to a depth of 1 mm.

(12) Taber Abrasion

Taber abrasion was measured in accordance with JIS K7311 using an H-18 ring under a load of 1 kg. The Taber abrasion was obtained as an amount of abrasion (mg) of the polyether ester elastomer after rotating the test specimen 1,000 times.

(13) de Mattia Flexure de Mattia flexure was measured in accordance with JIS K6301. Specifically, a crack having a size of 2 mm was formed on the test specimen and the resultant test specimen was flexed 100,000 times at room temperature. de Mattia flexure was obtained as the size of the crack after flexure.

(14) Surface Tack

Tack on the surface of the injection molded articles was evaluated by touching with fingers. Specifically, test specimens were touched by 20 people, and the surface tack of the specimen was evaluated, based on the number of people who said that the specimen was tacky. Following are the criteria for the evaluation.

◯: Not more than 5 people recognizes that the specimen was tacky.

Δ: 6 to 15 people recognizes that the specimen was tacky.

X: 16 or more people recognizes that the specimen was tacky.

(15) Heat Resistance

The tensile strength at break and elongation at break of a test specimen were measured in the same manner as in item (4) above. The test specimen was held at 110° C. for 500 hours, and then, the tensile strength at break and elongation at break of the test specimen were measured again. The retention of strength and the retention of elongation were calculated, based on the differences in the tensile strength at break and the elongation at break between measurements conducted before and after holding the test specimen at 110° C.

With respect to the change in the appearance of the test specimen, the discoloration caused by holding the test specimen under the above-mentioned high temperature condition was evaluated by visual observation.

EXAMPLE 1

To a 1-liter reactor for condensation reaction were charged 91 g of dimethyl terephthalate (guaranteed reagent, manufactured and sold by WAKO PURE CHEMICAL Industries Ltd., Japan), 102 g of 1,4-butanediol (guaranteed reagent, manufactured and sold by WAKO PURE CHEMICAL Industries Ltd., Japan), 130 g of PTMG produced in accordance with Reference Example 1, and 1.0 g of Irganox 1010 (manufactured and sold by CIBA-GEIGY, Switzerland). After purging the reactor with nitrogen gas, the reactor was heated to 200° C. under a nitrogen atmosphere. 0.1 g of tetraisopropyl titanate (extra pure reagent, manufactured and sold by Tokyo Kasei Kogyo Co., Ltd., Japan) was added to the reactor. The temperature of the reactor was maintained at 200° C. for 30 minutes and, then, the temperature was elevated to 230° C. and a transesterification reaction was performed for 2.5 hours. The amount of methanol distilled from the reactor was 95% of the theoretical value.

Subsequently, the temperature of the reactor was elevated to 250° C. and the internal pressure was reduced to 0.5 mmHg over 30 minutes. Then, a condensation reaction was performed for 2.5 hours. As a result, a transparent and viscous polyether ester elastomer was obtained.

Various properties of the obtained polyether ester elastomer were evaluated in accordance with the methods mentioned above. The results of the evaluations are shown in Table 2.

EXAMPLE 2

A polyether ester elastomer was produced in substantially the same manner as in Example 1, except that 91 g of dimethyl terephthalate, 102 g of 1,4-butanediol and 180 g of PTMG produced in accordance with Reference Example 1 were charged into the reactor.

Various properties of the obtained polyether ester elastomer were evaluated in accordance with the methods mentioned above. The results of the evaluations are shown in Table 2.

EXAMPLE 3

A polyether ester elastomer was produced in substantially the same manner as in Example 1, except that 91 g of dimethyl terephthalate, 102 g of 1,4-butanediol and 230 g of PTMG were charged into the reactor.

Various properties of the obtained polyether ester elastomer were evaluated in accordance with the methods mentioned above. The results of the evaluations are shown in Table 2.

EXAMPLE 4

A polyether ester elastomer was produced in substantially the same manner as in Example 1, except that PTMG produced in accordance with Reference Example 2 was used.

Various properties of the obtained polyether ester elastomer were evaluated in accordance with the methods mentioned above. The results of the evaluations are shown in Table 2.

EXAMPLE 5

A polyether ester elastomer was produced in substantially the same manner as Example 1, except that PTMG produced in accordance with Reference Example 3 was used.

Various properties of the obtained polyether ester elastomer were evaluated in accordance with the methods mentioned above. The results of the evaluations are shown in Table 2.

EXAMPLE 6

A polyether ester elastomer was produced in substantially the same manner as in Example 1, except that PTMG produced in accordance with Reference Example 4 was used.

Various properties of the obtained polyether ester elastomer were evaluated in accordance with the methods mentioned above. The results of the evaluations are shown in Table 2.

COMPARATIVE EXAMPLE 1

A polyether ester elastomer was produced in substantially the same manner as in Example 1, except that a part of the PTMG concentrate obtained from distillation column 5 in Reference Example 1 was used as PTMG. The PTMG used had a number average molecular weight of 1,950, a molecular weight distribution of 1.65, a content of high molecular weight PTMG molecules of 2.4% by weight, and a heteropolyacid content of 1,500 ppb.

Various properties of the obtained polyether ester elastomer were evaluated in accordance with the methods mentioned above. The results of the evaluations are shown in Table 2.

COMPARATIVE EXAMPLE 2

A polyether ester elastomer was produced in substantially the same manner as in Example 1, except that 230 g of PTMG used in Comparative Example 1, 91 g of dimethyl terephthalate and 102 g of 1,4-butanediol were used.

Various properties of the obtained polyether ester elastomer were evaluated in accordance with the methods mentioned above. The results of the evaluations are shown in Table 2.

COMPARATIVE EXAMPLE 3

A polyether ester elastomer was produced in substantially the same manner as in Example 1, except that 130 g of a conventional polyoxytetramethylene glycol (PTG-1800) (manufactured and sold by Hodogaya Chemical Co., Ltd., Japan), 91 g of dimethyl terephthalate and 102 g of 1,4-butanediol were used. The PTMG used had a number average molecular weight of 1.897, a molecular weight distribution of 2.54, a content of high molecular weight PTMG molecules of 13.39% by weight, and a heteropolyacid content of 0 ppb. These values were determined in accordance with the above-mentioned methods.

Various properties of the obtained polyether ester elastomer were evaluated in accordance with the methods mentioned above. The results of the evaluations are shown in Table 2.

TABLE 2

|  |  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Characteristics of an elastomer | $\eta_{rel}$ | 1.68 | 1.88 | 1.75 | 1.73 | 1.73 | 1.63 | 1.65 | 1.75 | 1.68 |
|  | Melting temperature (° C.) | 205 | 180 | 172 | 196 | 210 | 202 | 203 | 160 | 200 |
|  | Content of soft segment (wt %) | 42.4 | 56.2 | 70.6 | 43.8 | 42.8 | 42.5 | 43.0 | 72.3 | 42.7 |
| Mechanical properties | Tensile strength (kg · f/cm$^2$) | 255 | 210 | 165 | 220 | 280 | 235 | 235 | 110 | 205 |
|  | Elongation at break (%) | 860 | 920 | 1030 | 880 | 900 | 850 | 860 | 910 | 805 |
|  | Shore 'D' hardness | 48 | 37 | 28 | 48 | 46 | 49 | 49 | 27 | 50 |
| Low-temperature (−25° C.) characteristics | 10% modulus (kg · f/cm$^2$) | 90 | 55 | 25 | 97 | 86 | 103 | 117 | 43 | 127 |
|  | Elastic recovery (%) | 78.5 | 63.8 | 52.0 | 82.0 | 65.0 | 80.5 | 82.5 | 63.5 | 85.5 |
| Mold release characteristics |  | ⊚ | ⊚ | ○ | ⊚ | ⊚ | ○ | ○ | Δ | ○ |
| Dunlop impact resilience (%) |  | 65.0 | 69.1 | 79.1 | 67.0 | 68.0 | 61.5 | 60.5 | 75.2 | 60.5 |
| Permanent compression set (%) | Room temp. | 22 | 25 | 29 | 28 | 18 | 23 | 29 | 35 | 25 |
|  | 70° C. | 48 | 55 | 65 | 53 | 42 | 49 | 54 | 70 | 58 |
| Vicat softening temperature (° C.) |  | 150 | 135 | 125 | 140 | 156 | 147 | 145 | 115 | 142 |
| Taber abrasion (mg) |  | 100 | 136 | 140 | 125 | 80 | 130 | 110 | 150 | 150 |
| de Mattia flexure (mm) |  | 3.0 | 2.3 | 2.1 | 4.5 | 2.0 | 3.8 | 4.5 | 6.9 | 4.6 |
| Surface tackiness |  | ○ | ○ | ○ | ○ | ○ | Δ | Δ | X | Δ |
| Heat resistance (110° C., 500 hrs.) | Retention of strength (%) | 99 | 98 | 96 | 97 | 98 | 90 | 56 | 56 | 74 |
|  | Retention of elongation (%) | 98 | 99 | 98 | 96 | 97 | 95 | 65 | 54 | 68 |
|  | Change in appearance | None | None | None | None | None | None | Discoloration | Discoloration | None |

As apparent from the results shown in Table 2 above, the polyether ester elastomers of the present invention which were produced in the Examples using the specific PTMG's (each satisfying the requirements of the present invention) exhibit improved physical properties, as compared to the polyether ester elastomers produced in the Comparative Examples using PTMG's which do not satisfy the requirements of the present invention. Especially, the polyether ester elastomers of the Comparative Examples had low retention of strength and low retention of elongation (that is, the elastomers had poor heat resistance), as compared to those of the polyether ester elastomer of the present invention.

INDUSTRIAL APPLICABILITY

The polyether ester elastomer of the present invention not only is improved with respect to the basic properties required for an elastomer, such as excellent low-temperature characteristics, flexure resistance, abrasive resistance and elastic recovery, but also has other excellent properties, such as high mechanical strength and elongation, small permanent compression set, high softening temperature, excellent mold release characteristics during injection molding thereof, and no tack on the surface of the ultimate shaped articles. Such properties have not been conventionally achieved in the art. Therefore, the polyether ester elastomer of the present invention can be advantageously used for automobile parts (especially parts used around an engine and parts used for the interior of an automobile), a tube, a hose, a gear, industrial materials, such as a covering material for an electric cable, and an impact resistance modifier for polyester resins and polycarbonate resins.

What is claimed is:

1. A polyether ester elastomer comprising a copolymer of:
   (A) at least one aromatic dicarboxylic acid or an ester-forming derivative thereof;
   (B) at least one diol selected from the group consisting of an aliphatic diol and an alicyclic diol, each having 2 to 10 carbons; and
   (C) a polyoxytetramethylene glycol (PTMG),
   wherein said polyether ester elastomer contains PTMG units in an amount of from 10 to 90% by weight, based on the weight of said polyether ester elastomer,
   said PTMG having the following characteristics (1) to (4):
   (1) a number average molecular weight of from 500 to 4000;
   (2) a molecular weight distribution of 2.0 or less in terms of the Mw/Mn ratio, wherein Mw represents the weight average molecular weight of PTMG and Mn represents the number average molecular weight of PTMG;
   (3) a content of high molecular weight PTMG molecules of 10% by weight or less, based on the total weight of all PTMG molecules, wherein said high molecular weight PTMG molecules are defined as PTMG molecules having molecular weights which are at least six times as large as the number average molecular weight of all PTMG molecules; and
   (4) a heteropolyacid content of from 10 to 900 ppb by weight.

2. The polyether ester elastomer according to claim 1, wherein the number average molecular weight of said PTMG is 700 to 3000.

3. The polyether ester elastomer according to claim 1, wherein the molecular weight distribution of said PTMG is not more than 1.75.

4. The polyether ester elastomer according to claim 1, wherein the content of high molecular weight PTMG molecules is 2 to 5% by weight.

5. The polyether ester elastomer according to claim 1, wherein the heteropolyacid content of said PTMG is 10 to 500 ppb by weight.

* * * * *